United States Patent [19]
Redman et al.

[11] Patent Number: 5,660,415
[45] Date of Patent: Aug. 26, 1997

[54] TORQUE BOX ASSEMBLY FOR A VEHICLE

[75] Inventors: Forrest C. Redman, Lapeer; Bret A. Edwards, Rochester; Victoria A. Salmononwicz, St. Clair Shores; Max A. Corporon, Bloomfield Hills; Edwin L. Etnyre, Warren; Richard R. Churay, Troy; Andre Amyot, Auburn Hills, all of Mich.

[73] Assignee: Chrysler Corporation, Auburn Hills, Mich.

[21] Appl. No.: 669,186

[22] Filed: Jun. 24, 1996

[51] Int. Cl.⁶ .................................................. B62D 7/22
[52] U.S. Cl. .......................... 280/788; 280/690; 280/673; 296/204
[58] Field of Search ........................... 280/788, 690, 280/785, 660, 96.1, 673; 296/204, 203

[56] References Cited

U.S. PATENT DOCUMENTS

| | | | |
|---|---|---|---|
| 4,150,842 | 4/1979 | Hamada et al. | 296/204 X |
| 5,320,403 | 6/1994 | Kazyak | 296/203 |
| 5,385,369 | 1/1995 | Mukai et al. | 280/788 |
| 5,393,096 | 2/1995 | Pierce et al. | 280/788 |
| 5,468,018 | 11/1995 | Redman et al. | 280/788 |
| 5,558,369 | 9/1996 | Cornea et al. | 296/204 X |

*Primary Examiner*—Christopher P. Ellis
*Attorney, Agent, or Firm*—Thomas G. Pasternak

[57] ABSTRACT

A torque box assembly for mounting between a vehicle frame side rail and a body side sill for supporting a spool type trailing link isolator. The torque box assembly includes two interconnected box members and two mounting flanges, with the spool type trailing link resiliently connected to one of the box members.

8 Claims, 3 Drawing Sheets

TORQUE BOX ASSEMBLY FOR A VEHICLE

FIELD OF THE INVENTION

This invention relates generally to vehicle frames and body side sills and, more particularly, to a torque box assembly for resiliently supporting an end of a rear suspension trailing link. More specifically, the present invention relates to an improved torque box assembly for use with a spool type rear suspension trailing link isolator.

BACKGROUND OF THE INVENTION

A known torque box assembly is disclosed in U.S. Pat. No. 5,468,018, which discloses a torque box assembly for use with a bayonet type trailing link isolator. The torque box assembly disclosed therein does not allow use of a spool type rear suspension trailing link isolator, which is desirable in certain applications. The present invention thus improves upon the torque box assembly disclosed in that patent by allowing use of a spool type rear suspension trailing link isolator. The use of a spool type trailing link isolator is desirable because a spool type trailing link isolator is independently tunable for road noise, impact harshness and vehicle shake. Moreover, a hydro-elastic style bushing cannot be used with a bayonet type trailing link isolator, but can be used with a spool type trailing link isolator, which is advantageous.

SUMMARY OF THE INVENTION

A general object of the present invention is to provide an improved torque box assembly for use on a vehicle frame which allows use of a spool type trailing link isolator.

Another object of the present invention is to provide a rear underbody torque box assembly which retains a spool type rear suspension trailing link isolator; provides torsional stiffness to the vehicle; provides a hoist point at the rear of the vehicle; provides an attachment point for tie-down chains used on rail and truck carriers; and which is installed on the vehicle out of the underbody air stream, reducing drag.

These and other objects and advantages will become more apparent when reference is made to the following drawings and the accompanying description.

DESCRIPTION OF THE INVENTION

Figure 1:
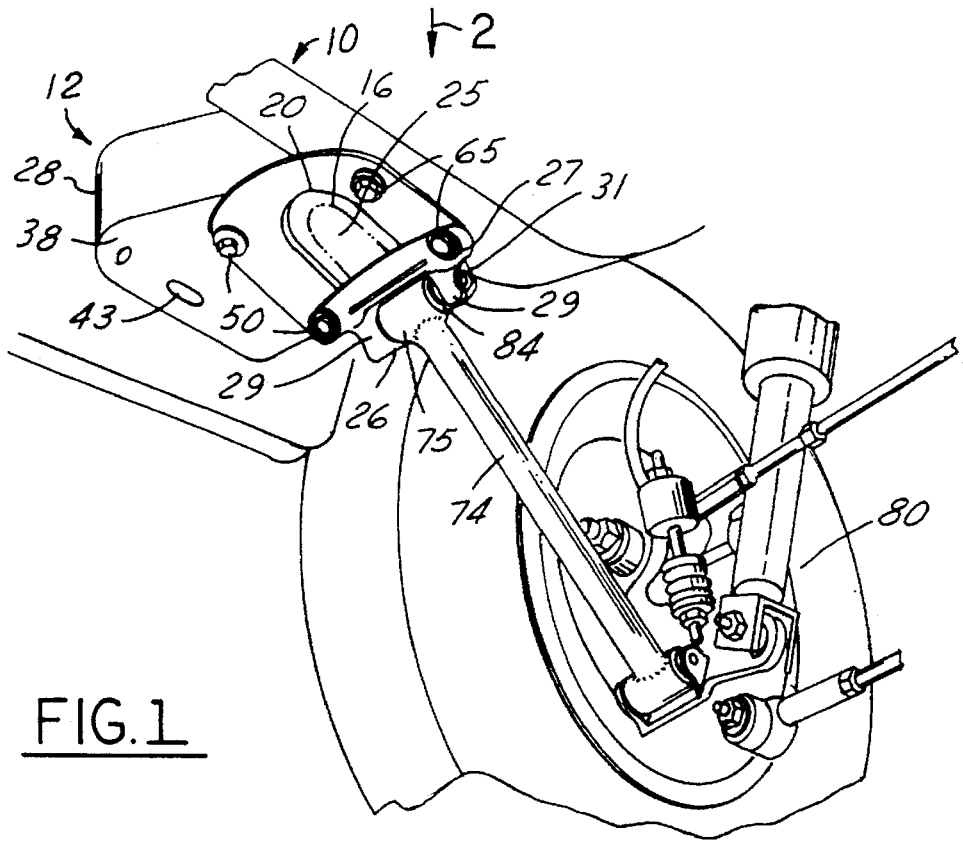
FIG. 1 is a fragmentary perspective view of a vehicle embodying the present invention.
Figure 2:
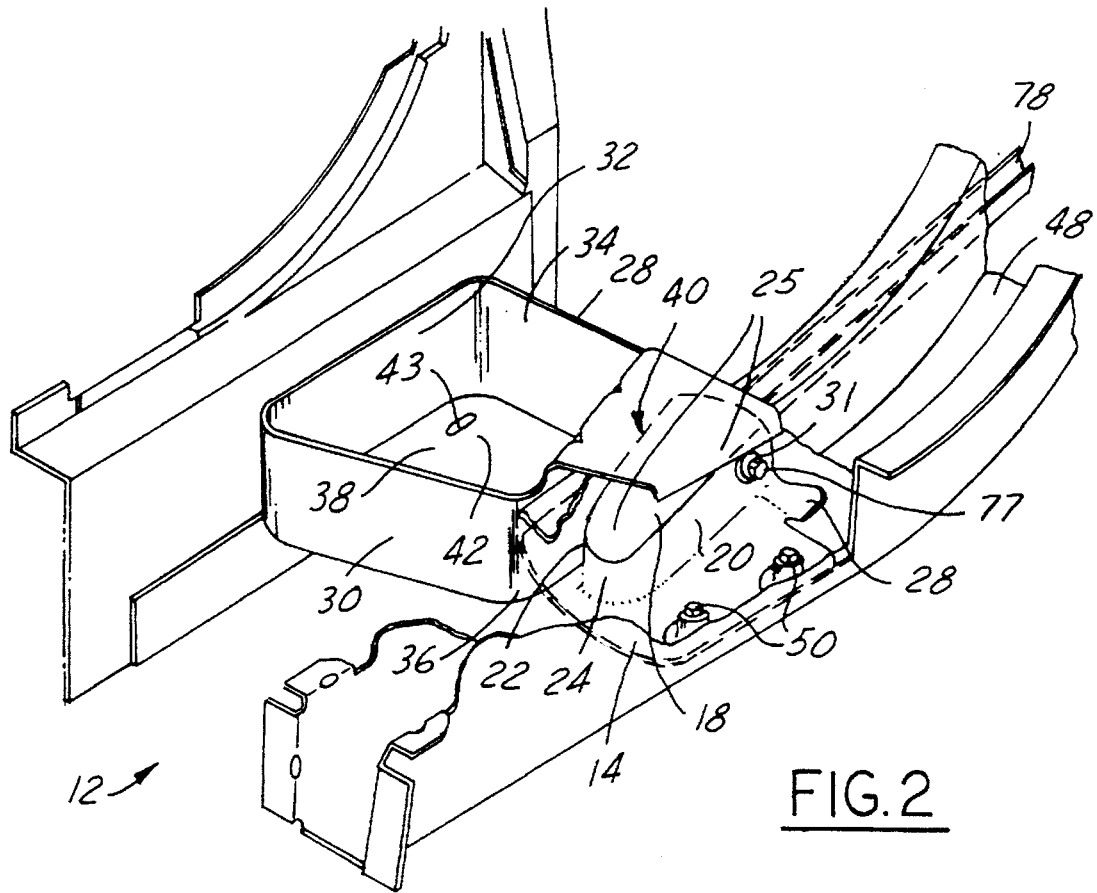
FIG. 2 is a perspective top view of the FIG. 1 structure.

Referring now to the drawings in greater detail, FIG. 1 and FIG. 2 show a vehicle frame 10 having rear underbody torque box assembly 12 mounted thereon. The torque box assembly 12 includes a plate member 14 having opening 16 formed in the center portion thereof, and a three sided box 18 mounted on the plate member around the edge of the opening. Box 18 comprises two tapered side walls 20 and 22 connected by curving front wall 24, and bottom wall 25. Lateral member 27 extends across plate member 14 across opening 26. Side walls 20 and 22 proximate open end 29 define spool bolt holes 31.

Four-sided box 28 includes three equal height walls 30, 32 and 34, a fourth higher wall 36, and a bottom wall 38. An outwardly extending flange 40 is formed on the upper edge of the fourth wall 36, and a down-turned edge 42 is formed on the free end of the flange 40. A small oval opening 43 is formed in the bottom wall 38, serving as a locking receptacle for a suitable hook (not shown) for securing tie down chains used on rail and truck carriers.

Figure 3:
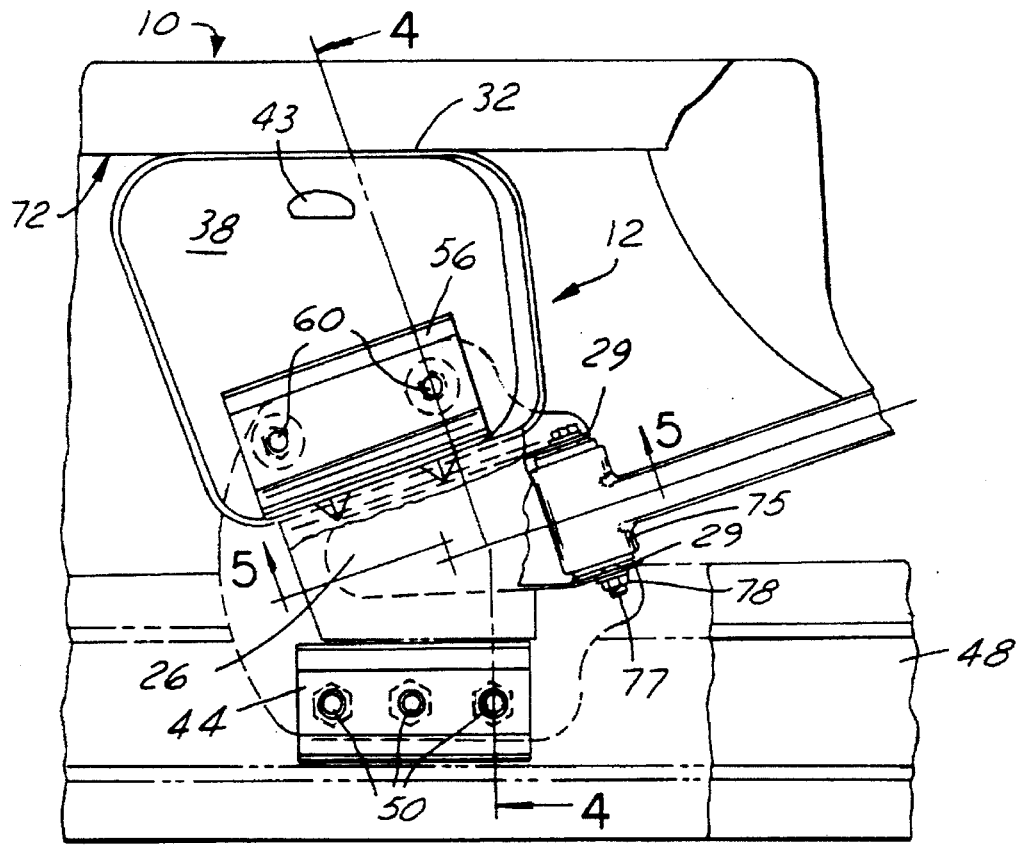
FIG. 3 is an enlarged plan view, partially broken away, of the FIG. 2 structure.
Figure 4:
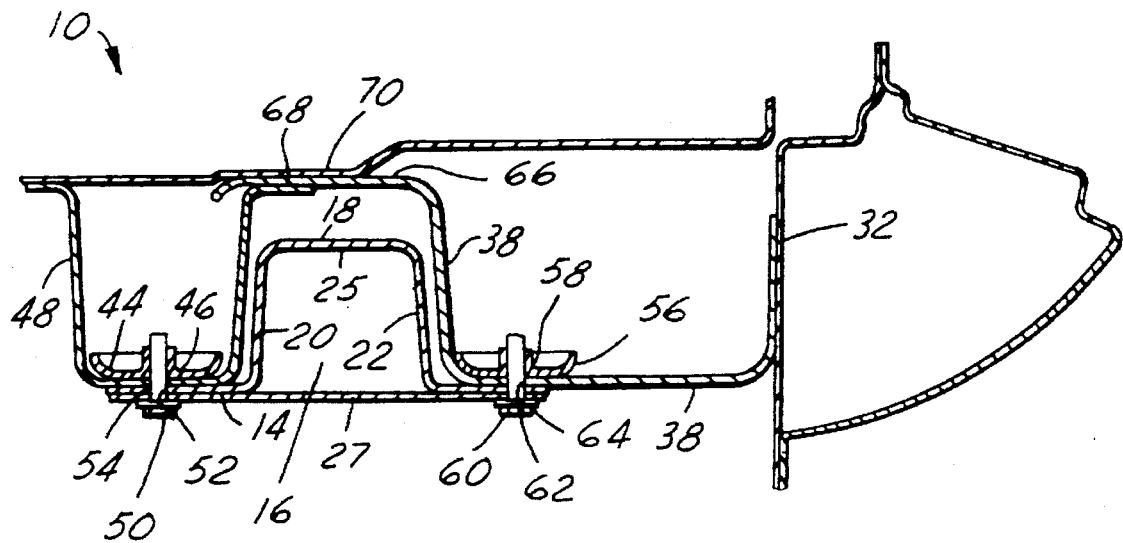
FIGS. 4 and 5 are cross-sectional views taken along the planes of the respective lines 4—4 and 5—5 of FIG. 3, and looking in the directions of the arrows.

Turning to FIGS. 3 and 4, a first mounting bracket 44 having two threaded openings 46 formed therein is mounted on a side rail 48 of the frame 10. Two bolts 50 extend through aligned openings 52 and 54 in the plate member 14 and the side rail 48, respectively, into the threaded openings 46. A second mounting bracket 56 having two threaded openings 58 formed therein is mounted on the bottom wall 38. Two bolts 60 extend through aligned openings 62 and 64 in the plate member 14 and the bottom wall 38, respectively, into the threaded openings 58.

As best seen in FIG. 4, the flange 66 extending from the wall 38 of the box 18 is secured between a side rail flange 68 and a floor pan 70, such as by spot-welding. For the vehicle shown herein, the side rail flange 68 is an extension of the side rail 48. As noted in FIG. 3, the wall 32 of the box 28 is secured to a body side sill 72 such as by spot-welding.

Flange 66 and side rail flange 68 may move laterally with respect to each other due to the structure of the present invention, which allows assembly within structures lateral forming width tolerances, which in turn allows for the use of automatic docking of rear suspension systems and less tolerance between suspension components and their fasteners.

A rear suspension trailing link 74 (FIG. 1, FIG. 3 and FIG. 5) extends from a wheel assembly 80 (FIG. 1) to spool type trailing link isolator 75 mounting via spool bolt 77 and spool nut 78 through spool bolt holes 31.

Figure 5:
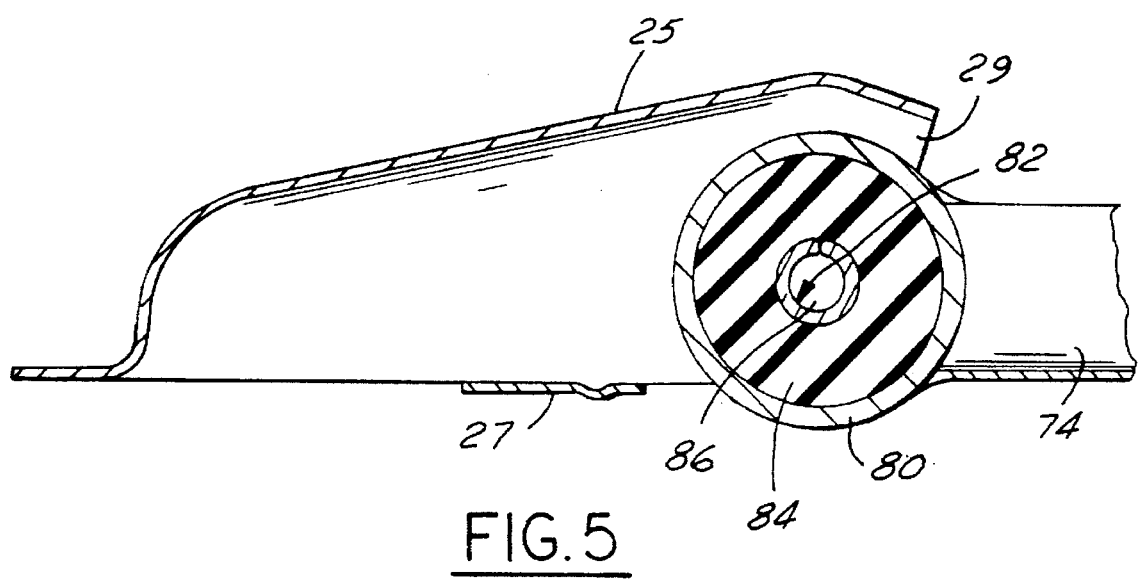

Turning to FIG. 5, the details of the spool type trailing isolator 75 are shown. Trailing link 74 culminates in ring 80. Bushing 84 is inserted into and fits tightly within ring 80. Bolt cylinder 82 fits snugly within bushing 84 and defines spool bolt passageway 86, through which the spool bolt 77 passes and is held in place by spool nut 78 to connect the trailing link to the torque box assembly of the present invention. As can be seen, the present invention preferably uses a spool type trailing link isolator, which is known in the art to be independently tunable for road noise, impact harshness, and vehicle shake. A spool type trailing link isolator moreover is compatible with hydro-elastic type bushings, also known in the art to be advantageous for noise reduction. Presently, bayonet type trailing link isolators do not allow use of hydro-elastic type bushings, and bayonet type tailing link isolators often present tuning difficulties.

While but one embodiment of the invention has been shown and described, other modifications in individual part shapes and sizes are possible as required to suit different vehicle frame requirements.

What is claimed is:

1. A torque box assembly for a vehicle having side rails, floor pan, and body side sills, a rear suspension trailing link with a spool type trailing link isolator, said torque box assembly comprises a first open-ended box which further comprises two side walls and a curved end wall formed on a plate member, said side walls further defining spool bolt holes proximate said open end for receiving the spool bolt of a spool type trailing link isolator, a second box including four walls and a bottom wall, first fastener means for securing said bottom wall to said plate member, and second fastener means for securing said plate member to at least one of said side rails.

2. The torque box assembly of claim 1 further comprising an out-turned flange formed on the free edge of one wall of said four walls of said second box and secured between a flange on one of said side rails and said floor pan, the wall opposite said one wall secured to at least one of said body side sills.

3. The torque box assembly of claim 2 further comprising a first mounting bracket on said bottom wall for receiving said first fastener means, and a second mounting bracket on at least one of said side rails for receiving said second fastener means.

4. The torque box assembly of claim 1 wherein said first and second fastener means are connected through said plate member on oppositely disposed sides of said first box.

5. The torque box assembly of claim 1 wherein said four walls of said second box includes three equal height walls and a fourth higher wall, with said out-turned flange being formed on said higher wall.

6. The torque box assembly of claim 2 wherein said out-turned flange is spot-welded between said floor pan and said flange of one of said side rails.

7. The torque box assembly of claim 1 wherein each of said first and second fastener means includes a bracket having a pair of threaded openings formed therein, and a pair of bolts extended through each of a pair of openings in said plate member and said bottom wall and a pair of openings in said plate member and at least one of said side rails, respectively, into said threaded openings.

8. The torque box assembly of claim 1 further comprising at least one opening formed in said bottom wall as a hoist point and/or a tie-down chain attachment point.

* * * * *